United States Patent Office 3,466,164
Patented Sept. 9, 1969

3,466,164
PROCESS FOR THE CONTROL OF PLANT GROWTH WITH N-(SUBSTITUTED BENZYLIDENE) ALKYL AMINES
Joseph F. De Gaetano, Montvale, and Adolph J. Deinet, Woodcliff Lake, N.J., assignors to Tenneco Chemicals, Inc., a corporation of Delaware
No Drawing. Continuation-in-part of application Ser. No. 410,730, Nov. 12, 1964. This application Mar. 29, 1968, Ser. No. 717,443
Int. Cl. A01n 9/20; C07c 119/10
U.S. Cl. 71—121
4 Claims

ABSTRACT OF THE DISCLOSURE

N-(substituted benzylidene) alkyl amines that have the structural formula

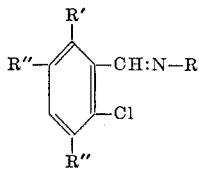

wherein R represents an alkyl group having from 1 to 16 carbon atoms; R' represents chlorine, a lower alkyl group, or a lower alkoxy group; and each R" represents hydrogen, chlorine, a nitro group, or an amino group are effective preemergence and post-emergence selective herbicides. Among the most active of these compounds is N-(2,3,6-trichlorobenzylidene)n-butyl amine.

---

This is a continuation-in-part of our copending application Ser. No. 410,730, now abandoned, which was filed on Nov. 12, 1964.

This invention relates to a process for the control of plant growth. More particularly, it relates to a process wherein N-(substituted benzylidene) alkyl amines are used to control or inhibit plant growth.

In accordance with this invention, it has been discovered that certain N-(substituted benzylidene) alkyl amines have unusual and valuable activity as selective herbicides. There compounds have the structural formula

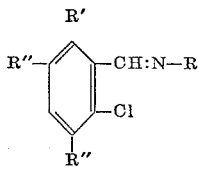

wherein R represents a straight-chain or branched-chain alkyl group having from 1 to 16 carbon atoms; R' represents chlorine, a lower alkyl group, or a lower alkoxy group; and each R" represents hydrogen chlorine, a nitro group, or an amino group. The preferred compounds for use in herbicidal compositions are those with chlorine atoms in the 2-, 3-, and 6-positions of the aromatic ring and optionally a nitro group or an amino group in the 5-position of the ring and with an alkyl group having from 3 to 6 carbon atoms attached to the nitrogen atom.

Illustrative of the herbicidal N-(substituted benzylidene) alkyl amines are the following: N-(2,3,6-trichlorobenzylidene) methyl amine, N-(2,3,6-trichlorobenzylidene) ethyl amine, N-(2,6-dichlorobenzylidene) propyl amine, N-(2,6-dichlorobenzylidene) isopropyl amine, N-(2-methyl-3,6-dichlorobenzylidene) n-butyl amine, N-(2-methoxy-3,6-dichlorobenzylidene) n-butyl amine, N-(2,3,5,6-tetrachlorobenzylidene) tert. butyl amine, N-(2,3,6-trichloro-5-nitrobenzylidene) n-amyl amine, N-(2,3,6-trichloro-5-aminobenzylidene) n-amyl amine, N-(2,3,6-trichlorobenzylidene) hexyl amine, N-(2,3,6-trichlorobenzylidene) 2-ethylhexyl amine, N-(2-methyl-3,5,6-trichlorobenzylidene) n-octyl amine, N-(2-methyl-3,5,6-trichlorobenzylidene) decyl amine, N-(2,3,6-trichlorobenzylidene) dodecyl amine, N-(2,3,6-trichlorobenzylidene) hexadecyl amine, and the like.

The N-(substituted benzylidene) alkyl amines of this invention may be prepared by any convenient procedure. For example, they may be prepared by the reaction of the appropriate substituted benzaldehyde and alkyl amine.

The N-(substituted benzylidene) alkyl amines may be applied to a wide variety of plants to control or inhibit their growth. They may be used to control the growth of weeds in an area containing a crop, or they may be used to destroy all plant growth in an area. They may be applied to the soil or other medium normally supporting plant growth to control or inhibit the growth of plants therein, or they may be applied to plants to control their growth.

While the compounds of this invention may be applied as such to the plants or to the soil, they are preferably used in combination with an inert carrier. They may be mixed with or deposited upon an inert finely-divided solid and employed as dusts. Such mixtures may, if desired, be dispersed in water with or without the aid of a wetting agent and the resulting aqueous suspensions employed as sprays. Alternatively, these compounds may be used as the active herbicidal constituents in oil-in-water emulsions.

The concentration of the N-(substituted benzylidene) alkyl amine in the herbicidal composition may vary within wide limits and depends upon a number of factors, the most important of which are the amount of the composition to be applied per unit of area and the type or types of plants being treated. In most cases the composition contains approximately 0.1 percent to 85 percent by weight of the herbicidal compound. The amount of the composition used is that which will provide the desired phytotoxic effect. Generally, it is used at a rate that will apply approximately 0.5 pound to 30 pounds and preferably 2.5 pounds to 10 pounds of the herbicidal compound per acre. Mixtures of two or more of the herbicidal compounds of this invention may be used. If desired, other herbicidal compounds may also be present in the herbicidal compositions.

This invention is illustrated by the examples that follow.

EXAMPLE 1

A mixture of 63 grams of 2,3,6-trichlorobenzaldehyde, 22 grams of n-butyl amine, and 300 ml. of ethanol was heated at its reflux temperature for two hours. Following the removal of the ethanol by distillation under reduced pressure, there was obtained 78 grams of N-(2,3,6-trichlorobenzylidene) n-butyl amine which contained 4.9% N and 40.6% Cl (calculated for $C_{11}H_{12}NCl_3$, 5.3% N and 40.3% Cl).

EXAMPLE 2

A herbicidal composition was prepared by the following procedure: Fifteen grams of N-(2,3,6-trichlorobenzylidene) n-butylamine was dissolved in 200 ml. of benzene. A 10 ml. portion of this benzene solution to which 2000 p.p.m. of sorbitan trioleate and 5000 p.p.m. of a polyoxyethylene ether of sorbitan monooleate had been added was dispersed in 190 ml. of distilled water to form an aqueous suspension that contained 0.375 percent by weight of the herbicidal compound.

EXAMPLE 3

Series of tests were carried out in which the product of Example 1 was evaluated as a preemergence and postemergence herbicide. In the preemergence tests, an aqueous suspension prepared by the procedure described in Example 2 was applied to groups of flats containing soil in which had been planted seeds of various plant species. The results of the tests were observed 10 days after the treatment. The postemergence tests were carried out by spraying seedlings of various plant species with the aqueous herbicidal suspension and observing the results 2 weeks after this treatment. In both series of tests the suspension was applied in amounts that supplied from 2.5 pounds to 10 pounds of the test compound per acre.

In the table that follows, a numerical scale is used to show the herbicidal activity of N-(2,3,6-trichlorobenzylidene) n-butyl amine. On this scale, "0" indicates no injury to the plants; "1"–"3" indicates slight injury; "4"–"6" indicates moderate injury; "7" to "9" indicates severe injury; and "10" indicates destruction of all plants.

HERBICIDAL ACTIVITY OF N-(2,3,6-TRICHLOROBENZYLIDENE) n-BUTYL AMINE

| Plant species | Amount of herbicidal compound applied (lb./acre) | | | | | |
| --- | --- | --- | --- | --- | --- | --- |
| | Preemergence | | | Postemergence | | |
| | 10 | 5 | 2.5 | 10 | 5 | 2.5 |
| Sugar beets | 10 | 10 | 6 | 10 | 9 | 7 |
| Clover | 10 | 7 | 7 | 10 | 10 | 5 |
| Soybeans | 10 | 10 | 10 | 9 | 10 | 10 |
| Wheat | 8 | 3 | 2 | 3 | 0 | 0 |
| Oats | 8 | 7 | 5 | 7 | 3 | 0 |
| Corn | 8 | 8 | 2 | 6 | 4 | 0 |
| Mustard | 10 | 10 | 10 | 10 | 10 | 8 |
| Morning Glory | 10 | 8 | 6 | 10 | 9 | 4 |
| Buckwheat | 7 | 0 | 0 | 8 | 4 | 0 |
| Barnyard grass | 9 | 8 | 6 | 5 | 3 | 0 |
| Crabgrass | 10 | 8 | 8 | 4 | 3 | 3 |
| Yellow Foxtail | 10 | 8 | 8 | 9 | 4 | 0 |

Each of the other N-(substituted benzylidene) alkyl amines can be used in a similar manner to control or inhibit the growth of a wide variety of broad-leafed plants and grasses.

The terms and expressions which have been employed are used as terms of description and not of limitation. There is no intention in the use of such terms and expressions of excluding any equivalents of the features shown and described or portions thereof; it is recognized that various modifications are possible within the scope of the invention claimed.

What is claimed is:
1. A process for the control of plant growth in a locus which comprises applying to the locus a phytotoxic amount of a herbicidal compound having the structural formula

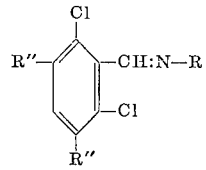

wherein R represents an alkyl group having from 1 to 16 carbon atoms and each R" represents hydrogen or chlorine.

2. The process of claim 1 wherein the herbicidal compound is N-(2,3,6-trichlorobenzylidene) n-butyl amine.
3. The process of claim 1 wherein the herbicidal compound is applied to the locus as a pre-emergence herbicide.
4. The process of claim 1 wherein the herbicidal compound is applied to the plants.

References Cited

UNITED STATES PATENTS

| | | | |
| --- | --- | --- | --- |
| 2,914,560 | 11/1959 | Robertson | 260—566 |
| 3,165,392 | 1/1965 | Koopman | 71—121 |
| 3,189,649 | 6/1965 | Rosinger et al. | 71—121 |
| 3,227,760 | 1/1966 | Richter et al. | 71—121 |
| 3,279,907 | 10/1966 | Lindner et al. | 71—121 |
| 3,305,347 | 2/1967 | Minieri | 71—121 |
| 3,409,426 | 11/1968 | Minieri et al. | 71—121 |

FOREIGN PATENTS

| | | |
| --- | --- | --- |
| 540,935 | 5/1957 | Canada. |
| 614,292 | 2/1961 | Canada. |
| 979,132 | 1/1965 | Great Britain. |
| 1,205,765 | 11/1965 | Germany. |

LEWIS GOTTS, Primary Examiner
G. HOLLRAH, Assistant Examiner

U.S. Cl. X.R.
260—566